W. H. BRADLEY.
SEAT SUPPORT FOR MOTOR CYCLES.
APPLICATION FILED APR. 28, 1913.
1,090,268.  Patented Mar. 17, 1914.
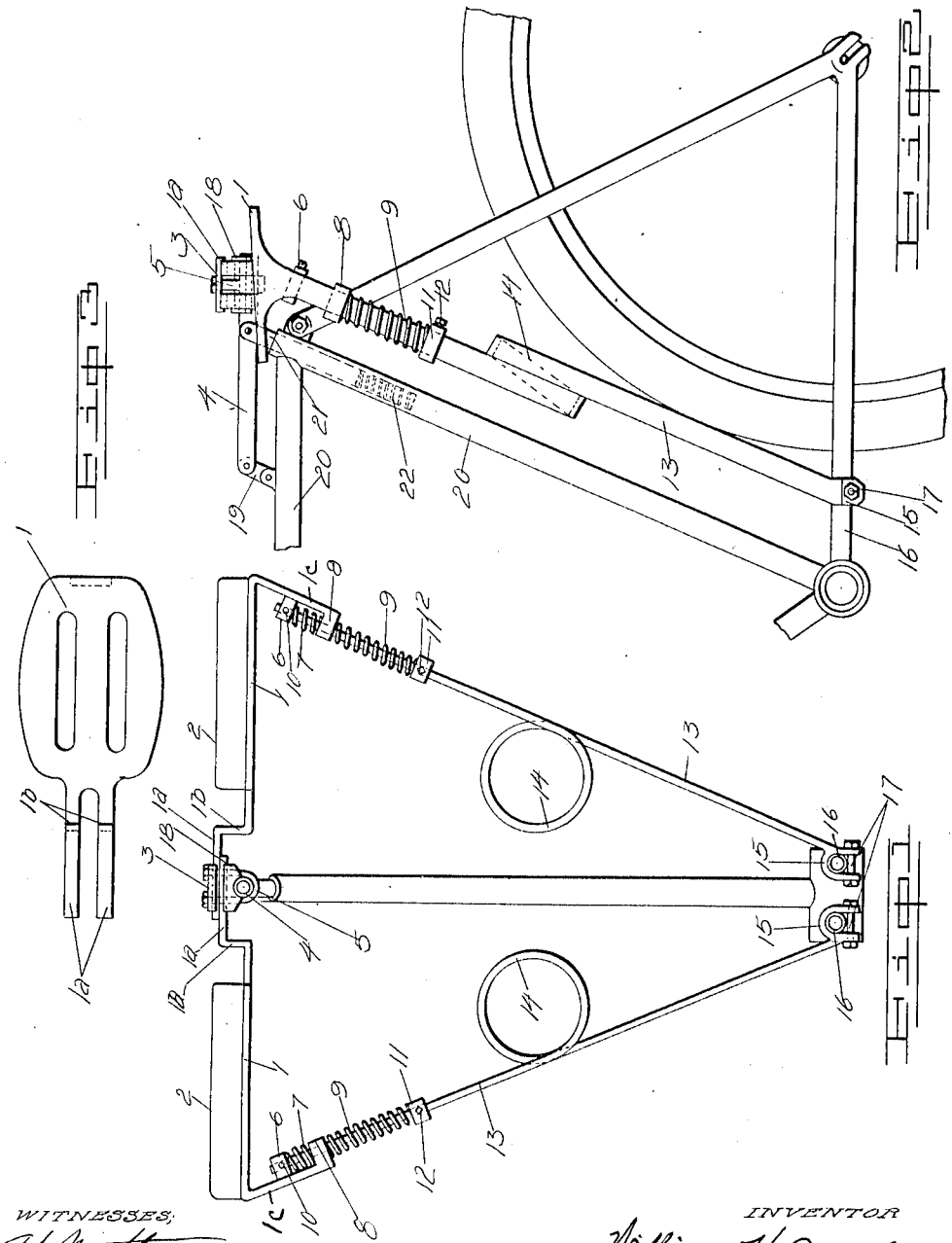

UNITED STATES PATENT OFFICE.

WILLIAM H. BRADLEY, OF PORTLAND, OREGON.

SEAT-SUPPORT FOR MOTOR-CYCLES.

1,090,268.  Specification of Letters Patent.  Patented Mar. 17, 1914.

Application filed April 28, 1913. Serial No. 764,006.

*To all whom it may concern:*

Be it known that I, WILLIAM H. BRADLEY, a citizen of the United States, residing at Portland, in the county of Multnomah and State of Oregon, have invented certain new and useful Improvements in Seat-Supports for Motor-Cycles, of which the following is a specification.

This invention relates to an improvement in seat supports for motor cycles, and has for its object to provide a support upon which two or more seats may be carried.

A further object is to provide a means by which said supports may yield in conformity to the movements of the yieldable saddle post.

These and other objects are accomplished by means of the structure illustrated in the accompanying drawing, in which—

Figure 1 is a rear elevation showing a portion of a motor cycle frame with my improvement mounted thereon. Fig. 2 is a side elevation showing the device as in use. Fig. 3 is a plan view of one member of the seat supports.

Referring to the drawing, 1 represents a pair of horizontal seat supports, each having a broad base adapted to carry a seat 2, and from the inner side of each of the arms 1ª, each pair having the angular portion 1ᵇ, extends to and across the saddle post bar 4, the one lapping upon the other, and, by means of the upper and lower members 3 and 18 respectively, and the U-bolt 5, they are adjustably secured to said bar 4, and are adapted to rise and fall with it as it vibrates on its post 19, and the saddle post 21, which rests upon the spring 22 carried in the member 20 of the diamond. From the outer end of each support is a depending portion 1ᶜ which is inwardly inclined, and which has formed on its terminal portion a bearing lug 8, each of which is adapted to receive the upper portion of the spring stay 13, which consists of a spring rod provided with an intermediate coil 14, and at its lower end is formed a bearing 15 adapted to engage and rest upon the horizontal member 16 of the diamond to which it is secured by means of the bolt 17.

Upon the upper terminal of each of the spring stays is secured a collar 6 by means of a set screw 10; and at a lower point is secured a similar collar 11, by means of set screw 12. Intermediate the collar 11 and the bearing lug 8 is secured a spring 9 upon each stay. These sustain the weight of the supports 1 together with the load carried by them, and they also allow the outer portion of the supports to yield in conformity to the motion of the saddle post upon its spring. The spring coil 14 serves a similar purpose. Between the collar 6 and the bearing 8 is interposed another spring 7, the purpose of which is to take up the recoil of the larger spring 9 and the spring 14 upon which the load is largely sustained.

The off-set at 1ᵇ allows of the construction of seats at substantially the same height as the main structure; and the clamp of the stays upon the bar 16 of the frame permits an adjustment of the support thereon.

By the construction here shown there is provided a support having a resilient effect, which is yieldable in conformity to the vibratory movements of the saddle post and which presents a neat and attractive appearance.

Having thus described my invention, what I claim, is—

1. A seat support for motor cycles and the like having a yieldable saddle post, a saddle bar pivotally secured thereto, transverse base members secured to said saddle bar, and a brace secured at each side to the lower portion of the frame and yieldingly united to its respective base member.

2. A seat support for motor cycles and the like having a yieldable saddle post, a saddle bar pivotally secured thereto, transverse base members adjustably secured to the saddle post, a spring brace secured at each side to the lower portion of the frame and means for adjustably connecting the terminal of each base member with its respective brace.

3. The combination of a motor cycle frame with a yieldable saddle post, a saddle bar pivotally secured to the frame and to said post, a pair of transverse bars secured to the saddle bar, the terminals of said bars being turned downwardly at an acute angle, a stay rising from the horizontal portion of the frame at each side having a slidable connection with its respective transverse bar, and a spring element for positioning and supporting its respective bar.

4. The combination with a motor cycle frame of a yieldable saddle post, a saddle bar pivoted to the frame and to the post, a pair of transverse seat supports adjustably secured to the saddle bar, a spring stay rising from the cycle frame at each side, having movable connection with its respective seat support, a spring element upon each spring stay for positioning and sustaining its respective seat support and means for adjusting said spring elements.

5. The combination with a motor cycle frame of a yieldable saddle post, a saddle bar pivoted to the frame and to the post, a pair of transverse seat supports adjustably secured to the saddle bar, a spring stay rising from the cycle frame at each side, having movable connection with its respective seat support, a spring element upon each spring stay for positioning and sustaining its respective seat support, means for adjusting said spring elements and means for taking up the recoil of the spring element.

In testimony whereof I affix my signature in presence of two witnesses.

WILLIAM H. BRADLEY.

Witnesses:
EDWIN E. HECKBERT,
HAZEL A. ARMSTRONG.

---

Copies of this patent may be obtained for five cents each, by addressing the "Commissioner of Patents, Washington, D. C."